US010338305B1

(12) United States Patent
Davis et al.

(10) Patent No.: US 10,338,305 B1
(45) Date of Patent: Jul. 2, 2019

(54) LUMINAIRE WITH INTEGRATED LIGHTGUIDE

(71) Applicants: Matthew A. Davis, Orange, CA (US); Sridhar Reddy Nimma, Cumming, GA (US)

(72) Inventors: Matthew A. Davis, Orange, CA (US); Sridhar Reddy Nimma, Cumming, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 23 days.

(21) Appl. No.: 15/345,217

(22) Filed: Nov. 7, 2016

Related U.S. Application Data (60) Provisional application No. 62/251,943, filed on Nov. 6, 2015.

(51) Int. Cl.
  *F21V 8/00* (2006.01)

(52) U.S. Cl.
  CPC ......... *G02B 6/0083* (2013.01); *G02B 6/0036* (2013.01); *G02B 6/0051* (2013.01); *G02B 6/0085* (2013.01); *G02B 6/0086* (2013.01)

(58) Field of Classification Search
  CPC .. G02B 6/0083; G02B 6/0036; G02B 6/0051; G02B 6/0085; G02B 6/0086
  USPC .......................................................... 362/612
  See application file for complete search history.

(56) References Cited

U.S. PATENT DOCUMENTS

| | | | | |
|---|---|---|---|---|
| 7,721,672 B2 * | 5/2010 | Nakano | ................... | G01D 11/28 116/286 |
| 2013/0044497 A1 * | 2/2013 | Sakamoto | ............ | G02B 6/0008 362/311.04 |
| 2015/0055369 A1 * | 2/2015 | Tarsa | ................... | G02B 6/0078 362/609 |

\* cited by examiner

*Primary Examiner* — Anh T Mai
*Assistant Examiner* — Jessica M Apenteng
(74) *Attorney, Agent, or Firm* — King & Spalding LLP (57) ABSTRACT

A luminaire can comprise a lightguide, a substrate to which an array of light emitting diodes is mounted, and a cover that extends over the substrate. A light-receiving edge of the lightguide can be positioned adjacent the array of light emitting diodes so that emitted light couples into the lightguide via that edge. The lightguide can guide the coupled light from the light-receiving edge to an opposing, light-emitting edge that emits the coupled light to provide illumination. The cover can comprise an aperture through which the lightguide extends, so that the cover may enclose the light-receiving edge while the light emitting edge may protrude through the aperture.

18 Claims, 9 Drawing Sheets

LUMINAIRE WITH INTEGRATED LIGHTGUIDE

PRIORITY CLAIM

The present application claims priority under 35 U.S.C. § 119 to U.S. Provisional Patent Application No. 62/251,943, titled "Luminaire With Integrated Lightguide," filed on Nov. 6, 2015, the entire contents of which are incorporated herein by reference.

STATEMENT REGARDING FEDERALLY SPONSORED RESEARCH OR DEVELOPMENT

This invention was made with government support under Contract Number DE_EE0006260 awarded by the United States Department of Energy. The government has certain rights in the invention.

TECHNICAL FIELD

Embodiments of the technology relate generally to lighting systems and more specifically to a luminaire that incorporates light emitting diodes (LEDs) and one or more lightguides for delivering illumination.

BACKGROUND

For illumination applications, light emitting diodes offer substantial potential benefits associated with their energy efficiency, light quality, and compact size. However, to realize the full potential benefits offered by light emitting diodes, new technologies are needed.

For instance, there are needs in the art for low-profile luminaires that can provide desirable illumination. Need further exists for a compact approach to transforming light from an array of light emitting into illumination that is relatively diffuse or that avoids harsh glare. Need further exists for a technology suited to producing light in a low-profile enclosure and guiding the light outside of the enclosure. Need further exits for a compact approach to light management in luminaires that incorporate lightguides for conveying light. Need further exists for integrating sensors, for example smoke detectors or occupancy sensors, with low-profile luminaires.

As another example of need, when light emitting diodes are mounted on a circuit board using some conventional approaches, aspects of the electrical system can be visible and thereby distractive or perceived as unsightly. Accordingly, there is a need for a cover to an electrical system that is connected to light emitting diodes. Additionally, it would be beneficial in some applications if the cover could manage emitted light.

A capability addressing one or more such needs, or some other related deficiency in the art, would support improved illumination systems and more widespread utilization of light emitting diodes in lighting applications.

SUMMARY

In some aspects of the disclosure, a luminaire can comprise an array of light emitting diodes. The light emitting diodes can have an associated circuit, for example an associated thick film circuit. The light emitting diodes and the circuit can be housed in an enclosure, for example mounted under a cover. The luminaire can further comprise at least one lightguide. The lightguide can comprise a light-receiving edge that is disposed adjacent the array of light emitting diodes under the cover. The lightguide can further comprise a light-emitting edge that is opposite from the light-receiving edge. In some examples, the lightguide is narrow, for example forming a strip. The light-emitting edge can protrude through an aperture in the cover. The lightguide can thus convey light from the light emitting diodes to outside the cover to produce illumination. In some examples, the cover can further comprise a concave exterior surface for diffusely reflecting (or otherwise managing) the light emitted by the lightguide.

The foregoing discussion of illumination is for illustrative purposes only. Various aspects of the present disclosure may be more clearly understood and appreciated from a review of the following text and by reference to the associated drawings and the claims that follow. Other aspects, systems, methods, features, advantages, and objects of the present disclosure will become apparent to one with skill in the art upon examination of the following drawings and text. It is intended that all such aspects, systems, methods, features, advantages, and objects are to be included within this description and covered by this application and by the appended claims of the application.

Many aspects of the disclosure can be better understood with reference to the above drawings. The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DESCRIPTION OF EXAMPLE EMBODIMENTS

In accordance with some example embodiments of the disclosure, a luminaire or lighting fixture can utilize thick film manufacturing technology and/or lightguide illumination to support compactness and/or configuration flexibility. Light emitting diodes and an associated driving circuit can be located on a rigid substrate within the luminaire, such as a surface of a housing base that may be coated with a thick film and that may comprise an embodiment of a circuit board. The light emitting diodes can face out from a surface of the substrate to interface with one or more lightguides that transmit light towards an area to be illuminated. The light may transmit in a direction parallel to a light emitting diode axis (or perpendicular or at some other appropriate angle), for example. A cover of the luminaire can act as a lightguide support, light reflector, and an electronics cover. Features such as an occupancy sensor or a fire sensor can be incorporated into circuitry of the luminaire. In some embodiments, the light emitting diodes can be dimmed or color mixed within the lightguides to create different visual effects.

Some representative embodiments will be further described hereinafter with example reference to the accompanying drawings that describe representative embodiments of the present technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 1A:
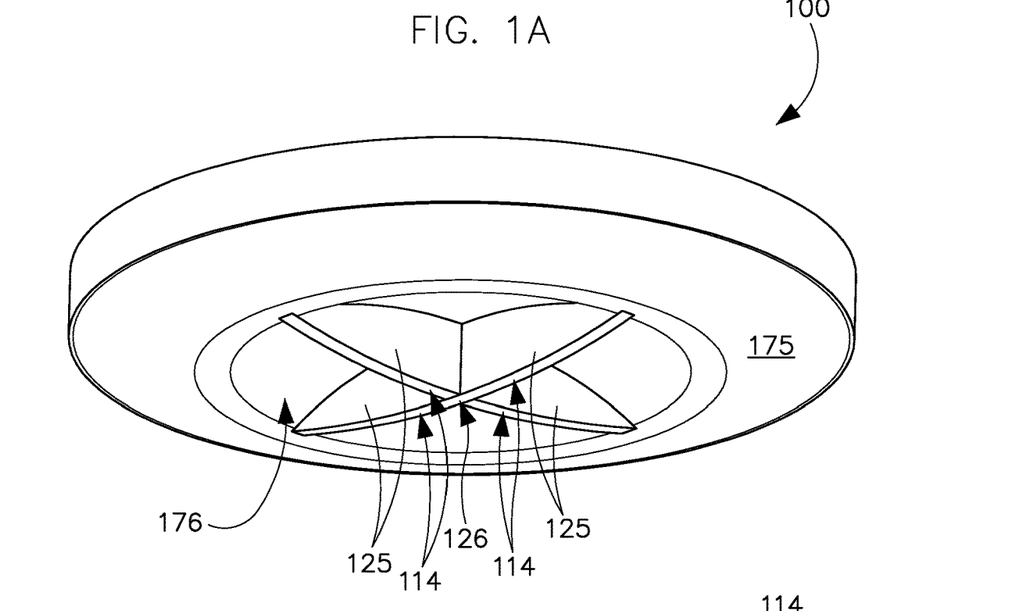
FIGS. 1A, 1B, and 1C (collectively FIG. 1) illustrate an example luminaire according to some embodiments of the disclosure.
Figure 1B:
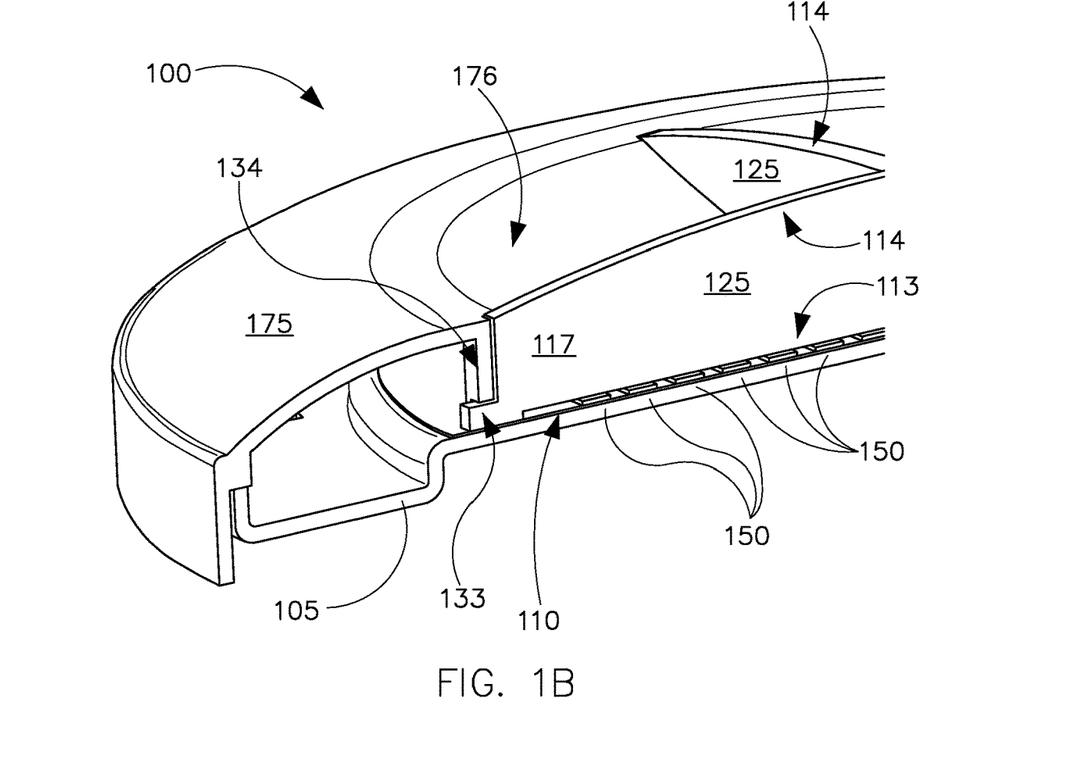
Figure 1C:
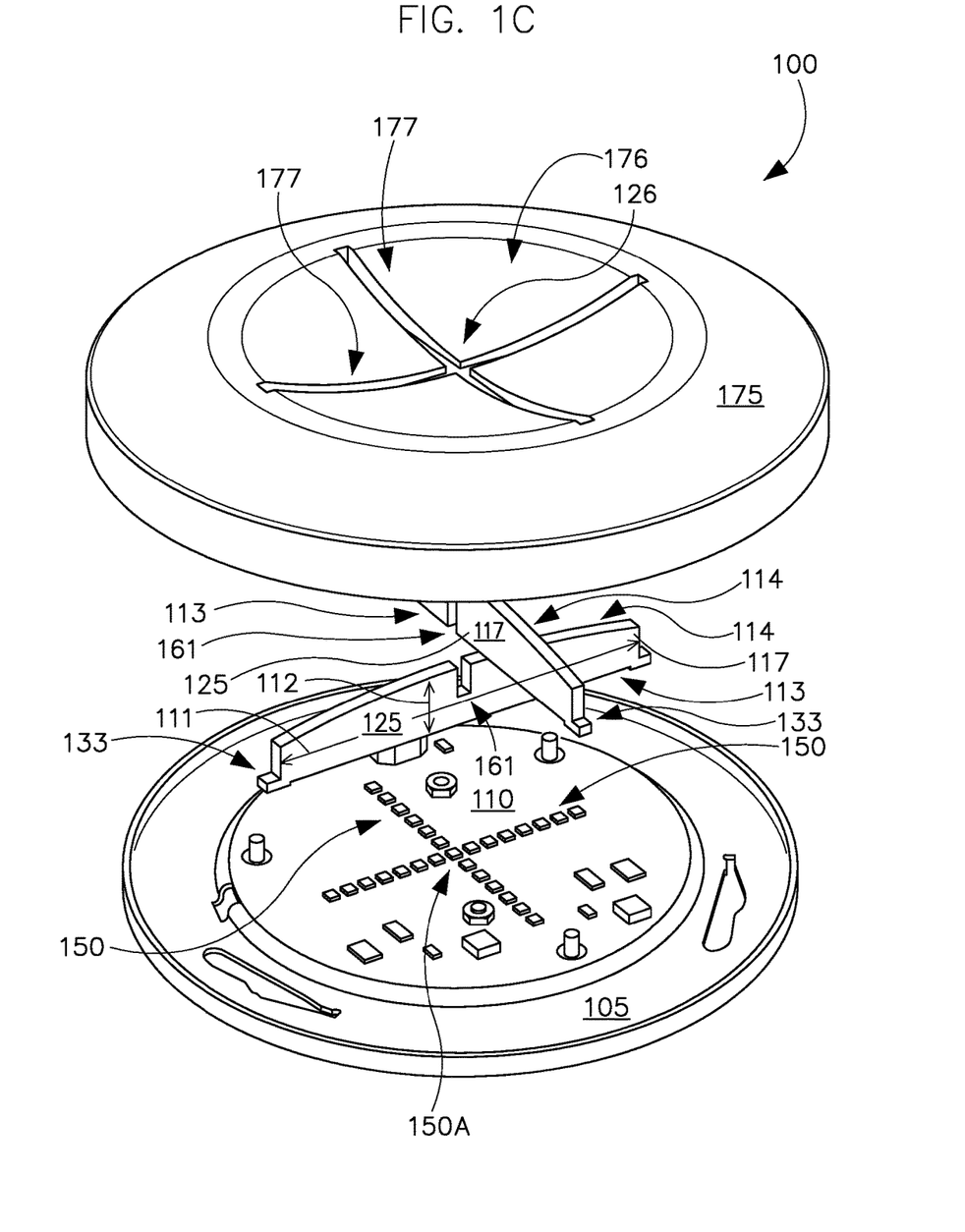

Referring now to FIGS. 1A, 1B, and 1C, a luminaire 100 is illustrated in accordance with some example embodiments of the disclosure. FIG. 1A illustrates a perspective view, FIG. 1B illustrates a perspective cutaway view, and FIG. 1C illustrates an exploded view that describes example assembly details.

In the illustrated example of FIGS. 1A, 1B, and 1C, the luminaire 100 comprises a sheet of metal 105 that is stamped and formed to provide a housing back. The sheet of metal 105 can be formed from a planar, flat plate or sheet of aluminum or steel, using a hydraulic press that creates three-dimensional contours as illustrated, for example.

A thick film coating 110 applied to a central area of the sheet of metal 105 provides an insulator for electrical circuitry. That is, the thick film coating 110 can comprise a dielectric material that is between the electrical circuit and the sheet of metal 105 and thus electrically insulates the electrical circuitry from the sheet of metal 105.

Thus, the thick film coating 110 and/or the sheet of metal 105 can comprise a circuit substrate for light emitting diodes 150, a light emitting diode driver, and other electronic components and circuit elements. In addition to providing structural support, the sheet of metal 105 can conduct heat away from the light emitting diodes 150 and other electrical circuitry elements and further facilitate heat dissipation.

As illustrated, the circuitry comprises linear arrays of light emitting diodes 150 that emit light outward, away from, or substantially perpendicular to the sheet of metal 105. Two lightguides 125 manage light emitted by the light emitting diodes 150. In the illustrated example, the two lightguides 125 are substantially perpendicular to one another. The lightguides 125 can comprise an optical plastic, for example optically transparent acrylic or polycarbonate. In the illustrated example embodiment, the lightguides 125 can be viewed as strips of optical material.

The lightguides 125 have light-receiving edges 113 adjacent the light emitting diodes 150. Light thus couples from the light emitting diodes 150 into the lightguides 125. The lightguides 125 guide the received light for emission out of opposing, light-emitting edges 114 of the lightguides 125, to provide illumination. In an example embodiment, each lightguide 125 comprises two major surfaces 117 that guide light between the receiving and emitting lightguide edges 113, 114 via total internal reflection. The major surfaces 117 of each lightguide 125 extend in a vertical dimension 112 between the light-receiving edge 113 and the light-emitting edge 114. In the illustrated example, light flows in the vertical dimension 112. The major surfaces 117 of each lightguide 125 further extend in the horizontal dimension 111 that is perpendicular to the vertical dimension 112 in the illustrated example. As illustrated, the vertical dimension 112 of the lightguides 125 is substantially smaller than the horizontal dimension 111. In some example embodiments, the horizontal dimension 111 is in a range of three times to ten times the vertical dimension 112. Other embodiments may have different length to width ratios.

In some example embodiments, one or both of the major surfaces 117 may be patterned with micro-optical features that extract internally incident light and further may provide directional control of the extracted light. The micro-optical features can help release light in a controlled fashion with directional bias, so that the major surfaces 117 totally internally reflect a portion of internally incident light while transmitting another portion of internally incident light. The resulting emitting light can be biased down towards a floor or laterally so that the illumination pattern may be beneficially directed for occupant visibility, for example.

In various example embodiments, micro-optical features on at least one of the major surfaces 117 can comprise microlenses, conical features, truncated cones, convex shapes, holes, concave structures, dimples, or other appropriate features, for example. In some example embodiments, the lightguides 125 can comprise one or more of the technologies disclosed in U.S. Pat. No. 8,459,858, the entire contents of which are hereby incorporated herein by reference. In some example embodiments, the lightguides 125 can comprise one or more of the technologies disclosed in U.S. Pat. No. 7,357,553, the entire contents of which are hereby incorporated herein by reference.

In the illustrated example of FIG. 1 and as best seen in FIG. 1C, each of the lightguides 125 respectively comprises a centrally located notch 161. The two notches 161 are disposed in an interlocking arrangement. In the illustrated example interlocking arrangement, the two notches 161 receive one another. As illustrated, the two linear arrays of light emitting diodes 150 have a common light emitting diode 150A that is oriented towards the two notches 161. Light from that light emitting diode 150A, which is centrally located in the illustrated example, transmits through and can be guided by both lightguides 125 in the area of the notches 161.

A cover 175 attaches to the sheet of metal 105 to form an enclosure that houses the thick film coating 110 and the light emitting diodes and associated drive circuitry. The thick film construction can support light emitting diodes 150 and built-in driver circuit elements, for example.

In the illustrated embodiment, the cover 175 comprises a concave area 176 that can function as or comprise a diffuse reflector for emitted light in some embodiments. Light thus emanates from the concave area 176 towards an area to be illuminated. For example, if the luminaire 100 is mounted to a ceiling or wall of a room, the luminaire 100 would illuminate the room.

The concave area 176 comprises apertures 177 that provide slots through which the lightguides 125 protrude or extend. The apertures 177 are elongated and sized to receive the lightguides 125. Accordingly, the lightguides 125 extend through or protrude from the cover 175 via the apertures 177. The lightguides 125 thus convey light out of the enclosure that is formed by the cover 175 and the sheet of metal 105, which comprises a housing back as discussed above.

Figure 2A:
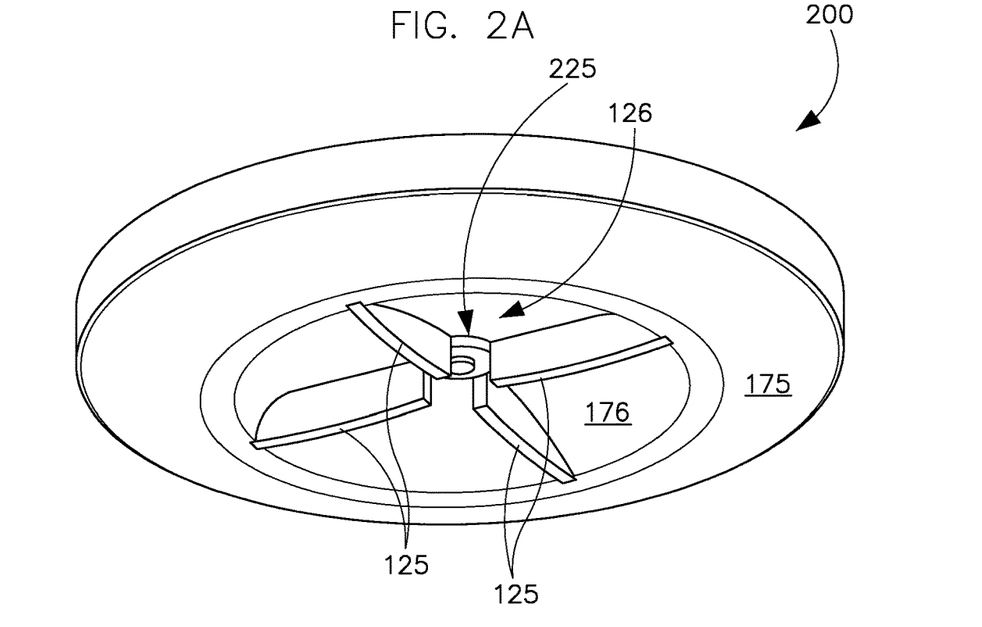
FIGS. 2A, 2B, 2C, and 2D (collectively FIG. 2) illustrate another example luminaire according to some embodiments of the disclosure.
Figure 2B:
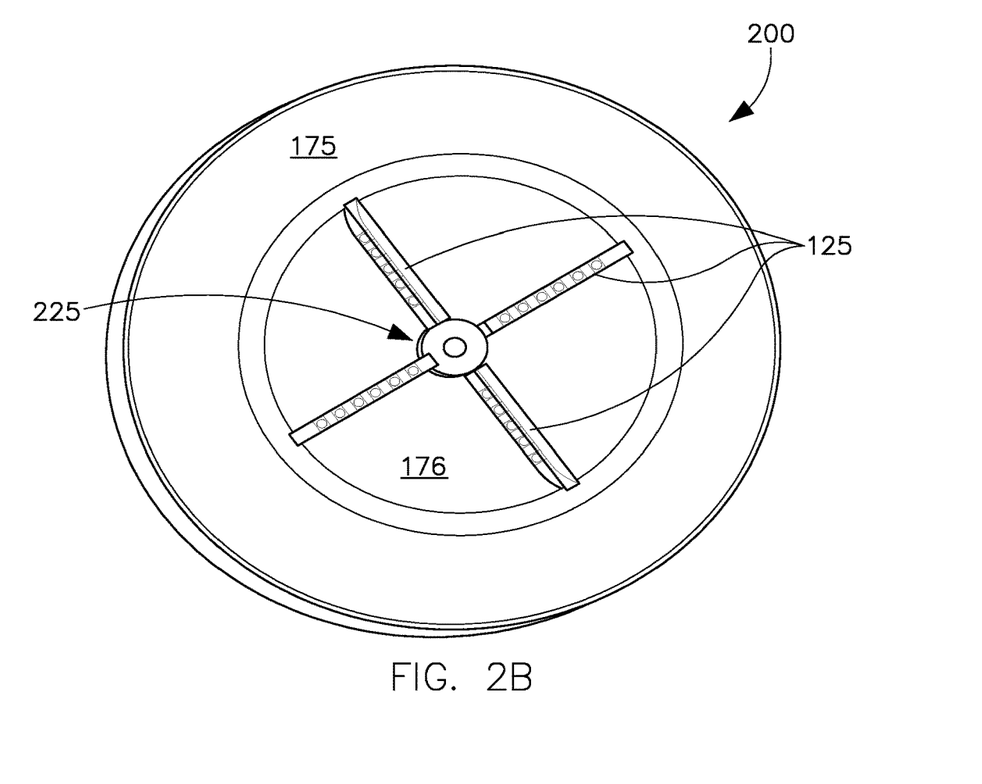
Figure 2C:
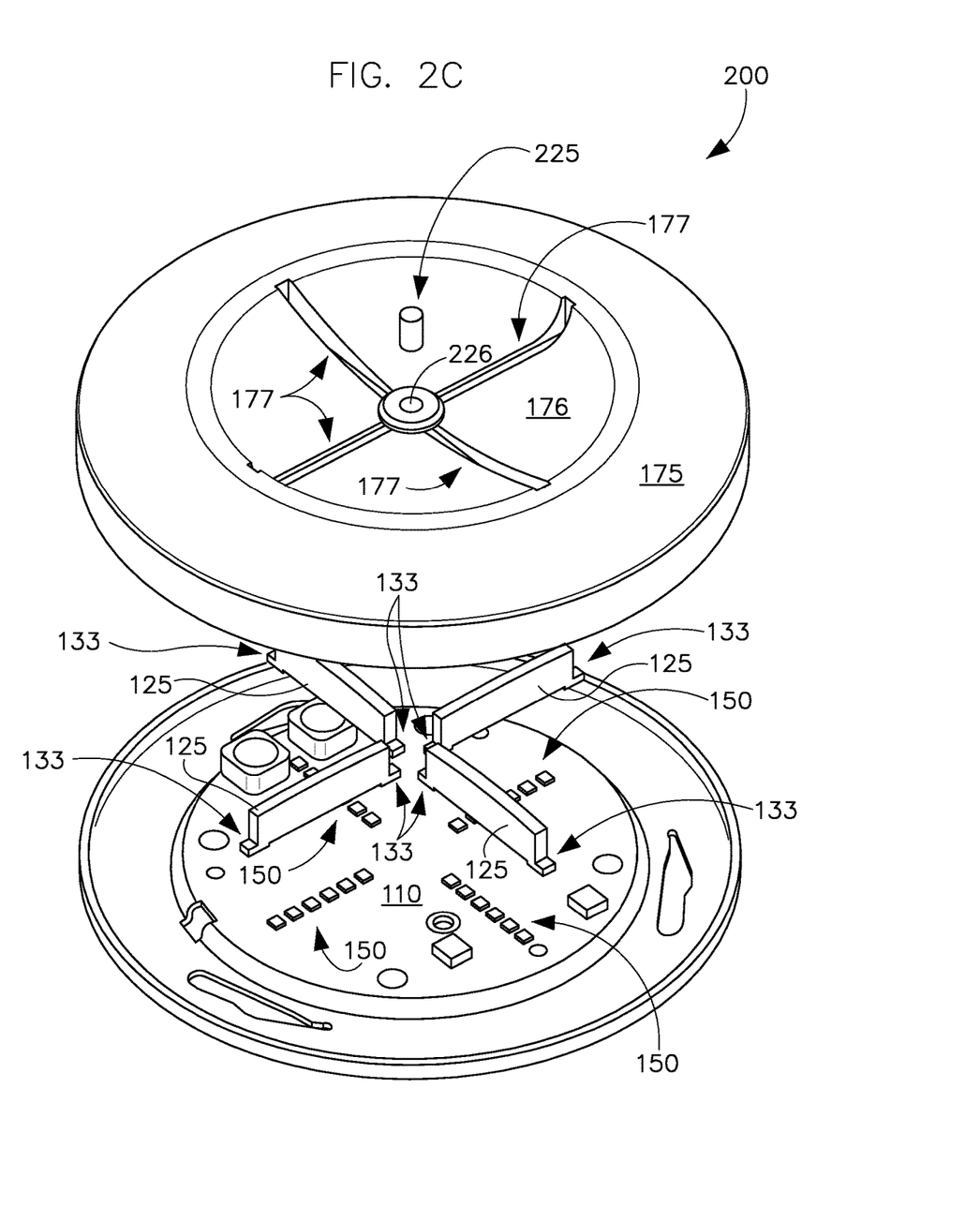
Figure 2D:
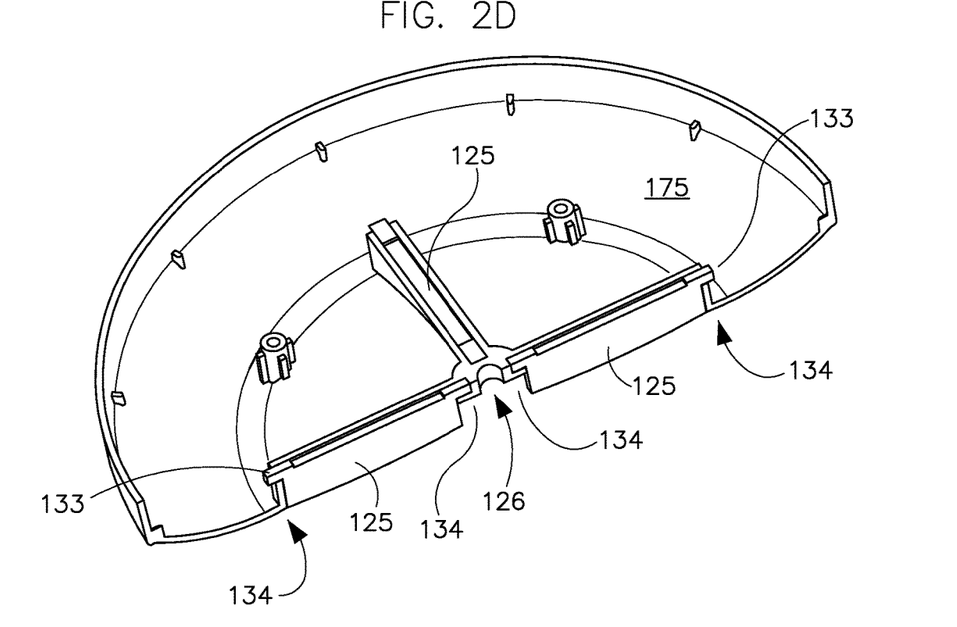

As shown in FIGS. 1C and 2C, the lightguides 125 comprise protrusions 133 extending radially (with respect to the luminaire center 126) at the longitudinal ends of the lightguides 125. As best seen in FIGS. 1B and 2D, the cover 175 comprises corresponding protrusions 134 that extend from the back of the cover 175 towards the sheet of metal 105 that forms a housing back and a circuit substrate as discussed above. As illustrated, the cover protrusions 134 are disposed adjacent the radial ends of the apertures 177, with the apertures 177 receiving the lightguides 125 as discussed above. As shown in FIGS. 1B and 2D, when the cover 175 is assembled with the sheet of metal 105, the cover protrusions 134 are aligned with the lightguide protrusions 133 and the cover protrusions 134 provide a shoulder that adjoins the lightguide protrusions 133. The sheet of metal 105 urges the lightguides 125 forward, while the cover protrusions 134 retain the lightguides 125. The lightguide protrusions 133 are captured in a gap formed between the cover protrusions 134 and the sheet of metal 105. The lightguide protrusions 133, the cover protrusions 134, the apertures 177, and the sheet of metal 105 thus cooperate to provide a lightguide retention system that maintains alignment between the lightguides 125 and the light emitting diodes 150.

Referring now to FIGS. 2A, 2B, 2C, and 2D, another luminaire 200 is illustrated in accordance with some example embodiments of the disclosure. FIGS. 2A and 2B illustrate perspective views. FIG. 2C illustrates an exploded view. FIG. 2D illustrates a perspective, cutaway view of the underside of the cover 175 with associated lightguides 125.

The embodiment illustrated in FIG. 2 comprises four separate lightguides 125 that extend through respective apertures 177 in the cover 175. The lightguides 125 extend radially outward from a central area 126 of the luminaire 200. As discussed above, a lightguide retention system maintains alignment between the lightguides 125 and the light emitting diodes 150 and retains the lightguides 125 in the apertures 177.

A sensor 225 is located at the center of the luminaire 200, in a space between the four lightguides 125. The sensor 225 extends through an opening 226 in the cover 175, which comprises a concave area 176 in the illustrated example embodiment as discussed above. In some embodiments, the sensor 225 comprises a motion sensor or occupancy sensor. In some embodiments, the sensor 225 comprises a fire or smoke sensor.

Figure 3A:
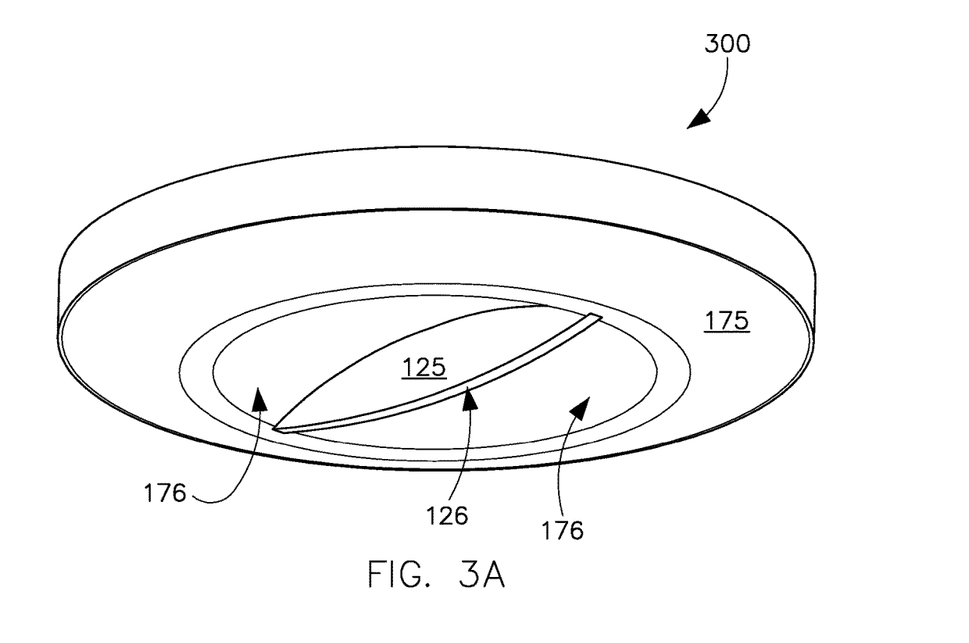
FIGS. 3A and 3B (collectively FIG. 3) illustrate another example luminaire according to some embodiments of the disclosure.
Figure 3B:
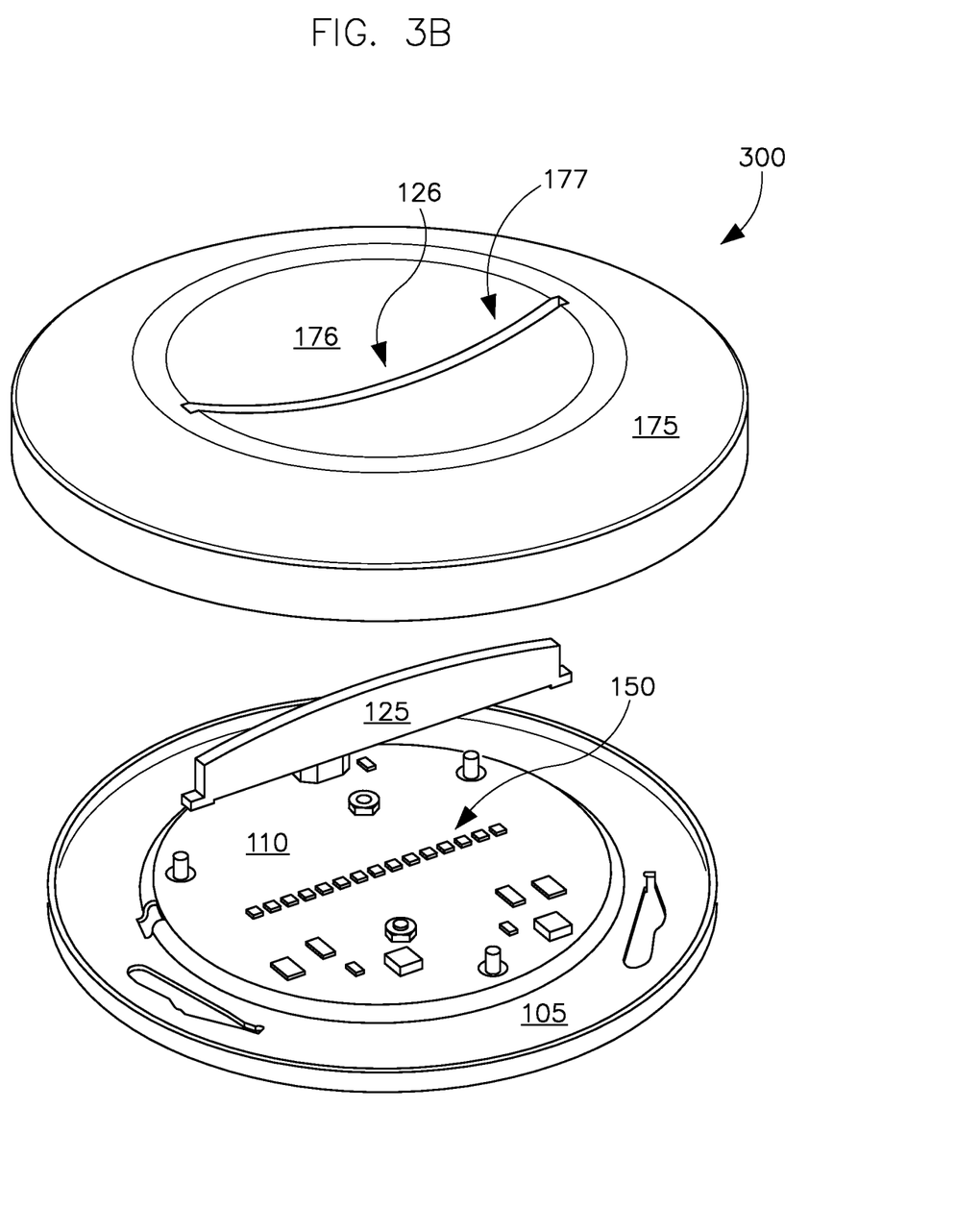

Referring now to FIGS. 3A and 3B, another luminaire 300 is illustrated in accordance with some example embodiments of the disclosure. FIG. 3A illustrates a perspective view of the luminaire 300. FIG. 3B illustrates an exploded view. In the embodiment of FIG. 3, the luminaire 300 comprises a single lightguide 125 coupled to a single linear array of light emitting diodes 150.

As discussed above, the lightguide 125 extends through an aperture 177 in a concave region 176 of the cover 175 of the luminaire 300. In further keeping with the foregoing discussion, a lightguide retention system maintains alignment between the lightguide 125 and the light emitting diodes 150 and retains the lightguides 125 in the aperture 177.

As illustrated in FIGS. 3A and 3B, the lightguide 125 substantially bisects the concave region 176 and passes through or across the luminaire center 126. Thus, the lightguide 125 extends in two opposing directions from the luminaire center 126. The lightguide 125 conveys the light out of the luminaire 300 to provide illumination. For example, the luminaire 300 can emit light from overhead in a ceiling-mounted application or from a wall in a wall-mounted application.

Figure 4A:
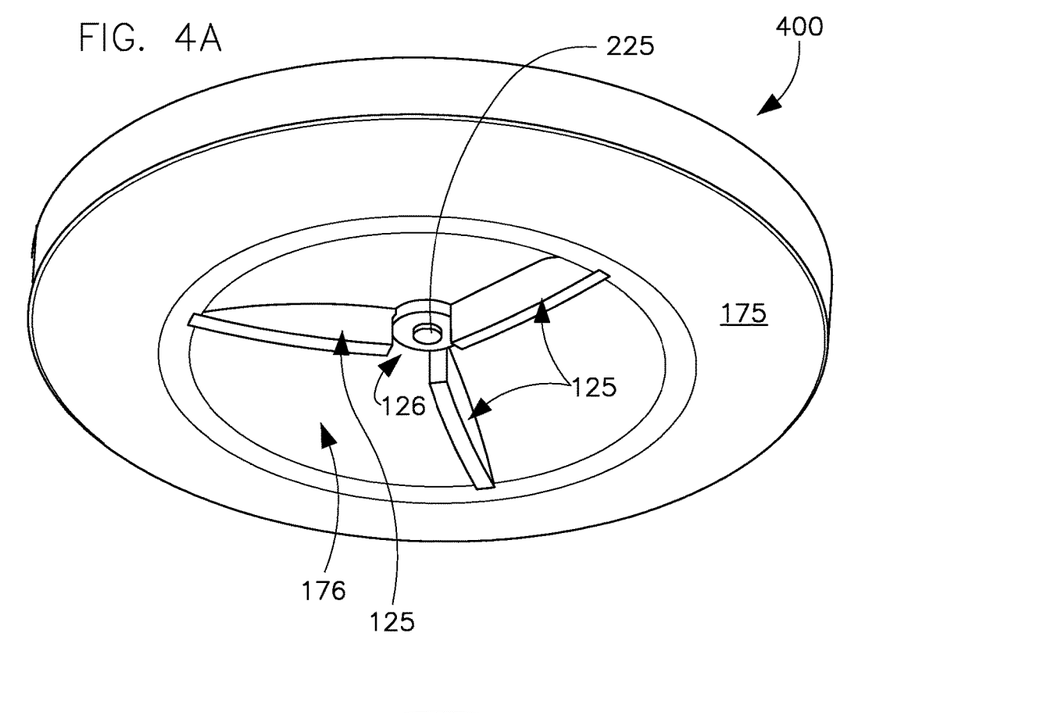
FIGS. 4A, 4B, 4C, and 4D (collectively FIG. 4) illustrate another example luminaire according to some embodiments of the disclosure.
Figure 4B:
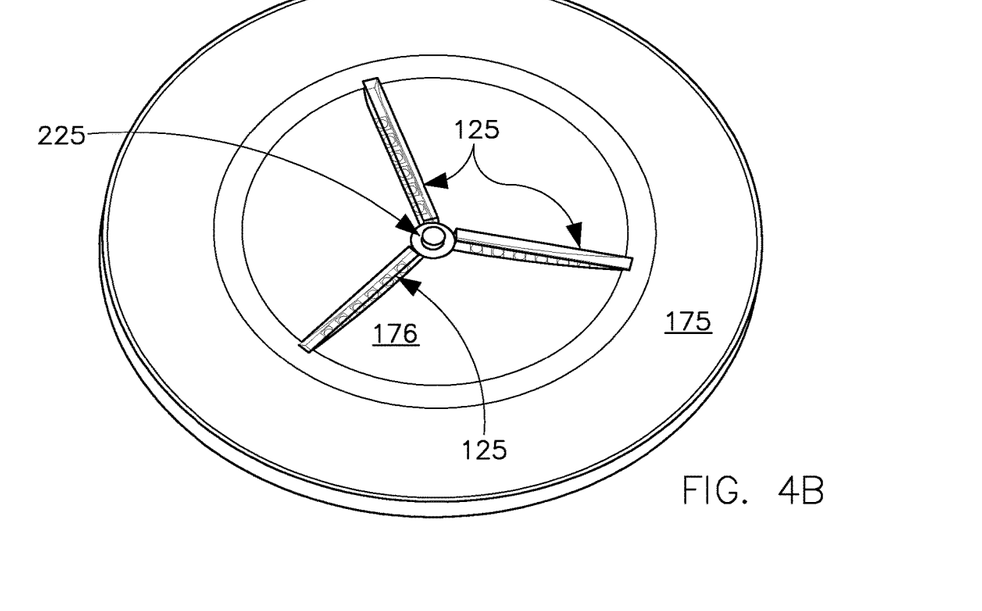
Figure 4C:
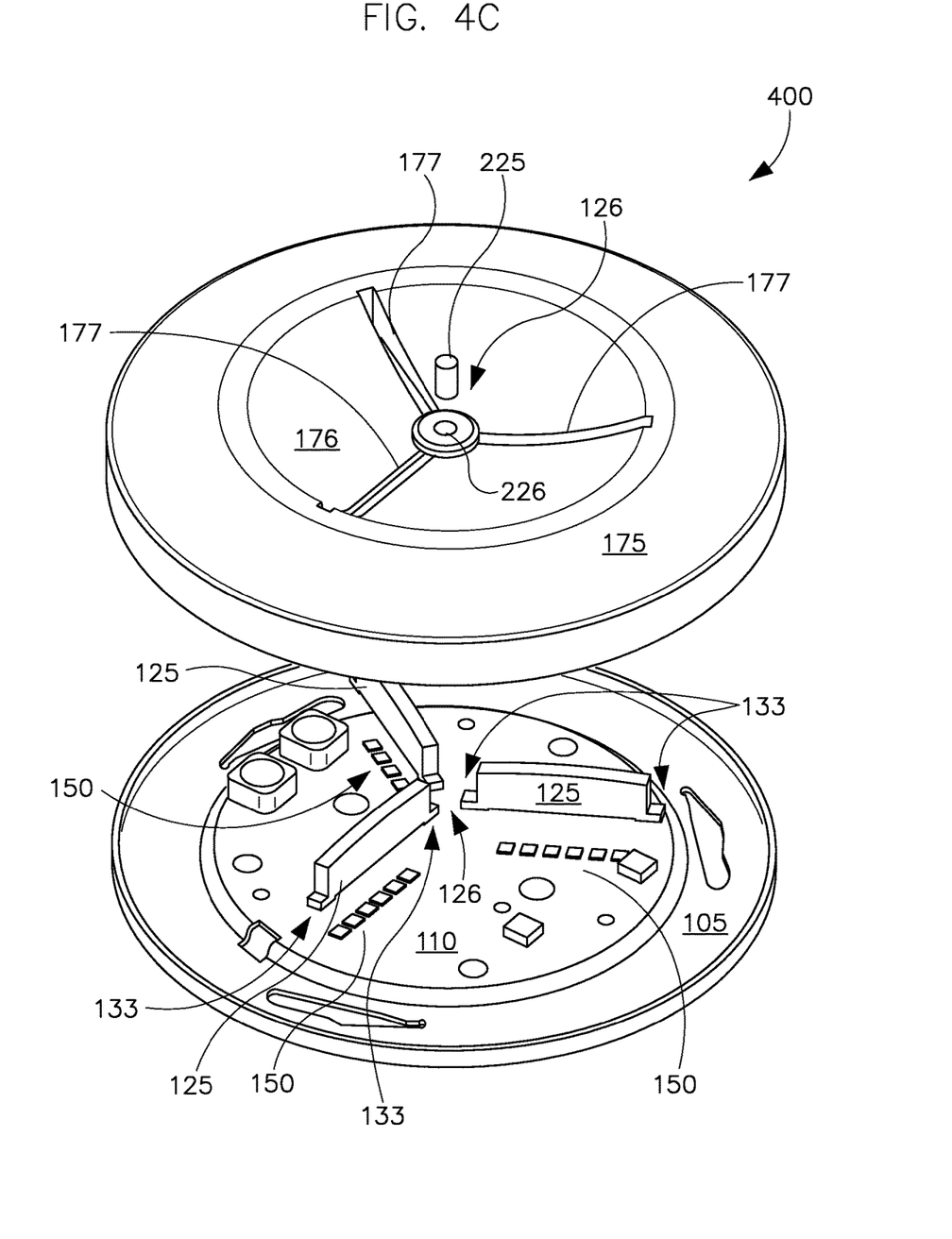
Figure 4D:
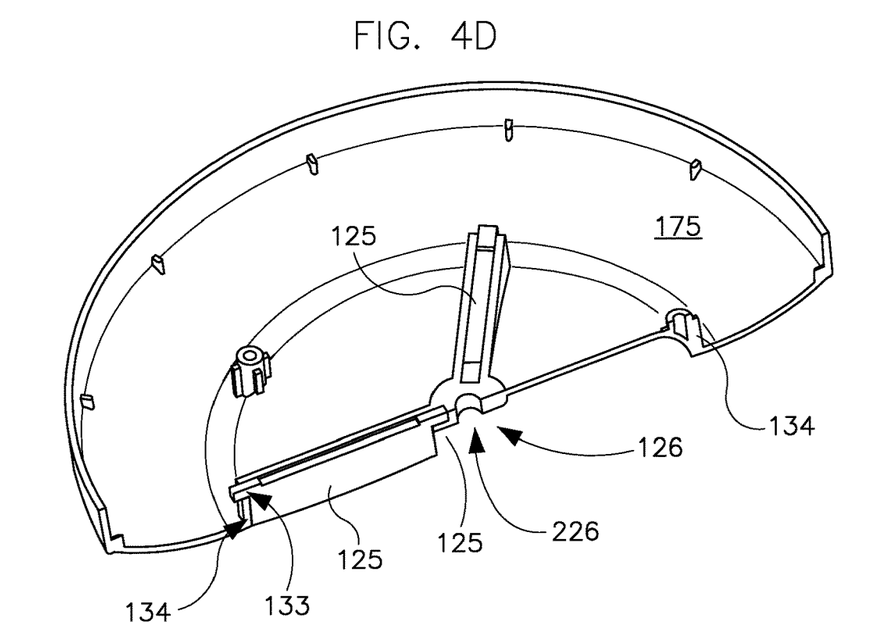

Referring now to FIGS. 4A, 4B, 4C, and 4D, another luminaire 400 is illustrated in accordance with some example embodiments of the disclosure. FIGS. 4A and 4B illustrate perspective views of the luminaire 400. FIG. 4C illustrates an exploded view. FIG. 4D illustrates a perspective, cutaway view of the underside of the cover 175 with associated lightguides 125.

The embodiment illustrated in FIG. 4 comprises three distinct lightguides 125 that extend through respective apertures 177 in the cover 175 and radiate from the luminaire center 126. As illustrated in FIGS. 4C and 4D and as discussed above, the lightguides 125 comprise lightguide protrusions 133 that contact cover protrusions 134 for retention in the luminaire 400. Thus, the cover 175 can capture the lightguides 125 between the cover 175 and the sheet of metal 105 that forms a backside of the luminaire 400.

The lightguides 125 extend radially outward from a central area 126 of the luminaire 400, in a concave area 176 that may be viewed as a depression. In the illustrated example, the lightguides 125 are spaced at approximately 120 degrees of angular separation. As discussed above, the concave area 176 can direct light downward or outward, into a room or towards an indoor our outdoor space to be illuminated. In some embodiments, the cover 175 comprises white plastic, and the concave area 176 can diffusely reflect incident light.

A sensor 225 is located at the center 126 of the luminaire 400, in a space between the three lightguides 125. The sensor 225 extends through an opening 226 in the cover 175. In some embodiments, the sensor 225 comprises a motion sensor or occupancy sensor. In some embodiments, the sensor 225 comprises a fire or smoke sensor.

Figure 5:
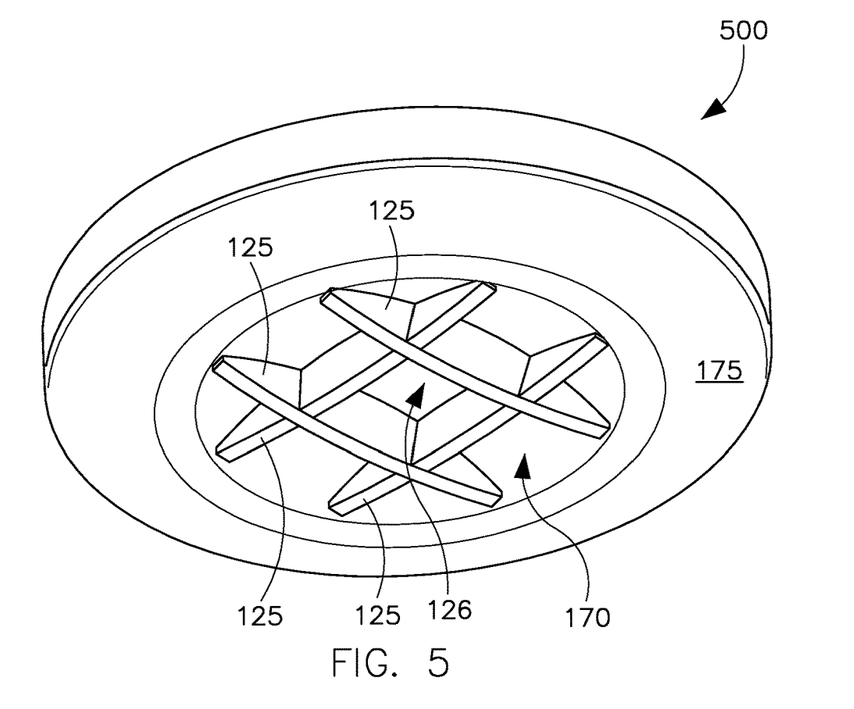
FIG. 5 illustrates another example luminaire according to some embodiments of the disclosure.

Referring now to FIG. 5, another luminaire 500 is illustrated in accordance with some example embodiments of the disclosure. In the embodiment of FIG. 5, the luminaire 500 comprises four lightguides 125 that are arranged to provide a grid geometry within the concave area 176. In this example grid arrangement, the lightguides 125 cross over one another to form a hashed or net pattern. In this arrangement, the lightguides 125 can be characterized as forming a pattern of intersecting lines, for example. The crossings can comprise notches 161 (not visible in FIG. 5) as illustrated in FIG. 1C and discussed above. Other example embodiments may incorporate additional lightguides to form a grid comprising three, four, five, or more columns and corresponding rows.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:
1. A luminaire comprising:
an array of light emitting diodes mounted to a rigid substrate to emit light away from the rigid substrate;
a cover that extends over the rigid substrate and that comprises an elongate aperture and a cover protrusion extending toward the rigid substrate, and
a lightguide extending through the elongate aperture, the lightguide comprising:
a first edge that extends lengthwise along the array of light emitting diodes to receive light from the array of light emitting diodes;

a second edge disposed opposite the first edge to emit the received light;

third and fourth edges that extend between the first and second edges, the third and fourth edges each comprising a lightguide protrusion that is retained against the rigid substrate by the cover protrusion; and first and second major surfaces that are operative to guide light between the first edge and the second edge via internal reflection, that extend a first length between the first edge and the second edge, and that extend a second length between the third edge and the fourth edge, the second length substantially greater than the first length.

2. The luminaire of claim 1, wherein the lightguide forms a strip that extends along the rigid substrate.

3. The luminaire of claim 1, wherein the second edge comprises a first notch, wherein the luminaire further comprises a second lightguide that comprises a second notch, and wherein the second lightguide is disposed perpendicular to the lightguide, with the first notch and the second notch disposed in an interlocking arrangement.

4. The luminaire of claim 1, further comprising a second lightguide and a third lightguide that are substantially perpendicular to the lightguide.

5. The luminaire of claim 1, further comprising a second lightguide and a third lightguide, wherein the lightguide, the second lightguide, and the third lightguide extend radially from a central portion of the luminaire with approximately 120 degrees of separation.

6. The luminaire of claim 5, wherein the central portion of the luminaire comprises an occupancy sensor or a fire sensor.

7. The luminaire of claim 1, wherein the lightguide is one of a plurality of lightguides that are arranged to form a grid within a depression formed on an outer surface of the luminaire.

8. The luminaire of claim 1, wherein the lightguide is one of a plurality of lightguides that are arranged to form a pattern of intersecting lines.

9. The luminaire of claim 1, wherein the substrate comprises a thick film of dielectric material coated on a sheet of metal.

10. The luminaire of claim 1, wherein the cover forms a concave region defined by a smooth curve, the concave region configured to face an area to be illuminated, wherein the lightguide extends through the elongate aperture in the concave region.

11. The luminaire of claim 1, wherein the second edge of the lightguide is disposed outside the cover.

12. The luminaire of claim 1, wherein a portion of the lightguide is disposed between the cover and the rigid substrate, and wherein another portion of lightguide protrudes through the cover.

13. A luminaire comprising:

an enclosure comprising a cover, the cover comprising an elongate aperture and a cover protrusion extending toward a rigid substrate;

an array of light emitting diodes that is disposed in the enclosure and that is mounted to the rigid substrate; and a lightguide extending through the elongate aperture, the lightguide comprising:

a first edge that is disposed in the enclosure and that extends lengthwise along the array of light emitting diodes to receive light from the array of light emitting diodes;

a second edge that is disposed outside the enclosure to emit the received light towards an area to be illuminated;

third and fourth edges that extend between the first and second edges, the third and fourth edges each comprising a lightguide protrusion that is retained against the rigid substrate by the cover protrusion; and first and second major surfaces that extend between the first edge and the second edge and that are operative to guide the received light between the first edge and the second edge via internal reflection.

14. The luminaire of claim 13, wherein portions of the first and second major surfaces protrude through the elongate aperture in the cover.

15. The luminaire of claim 13, further comprising a second lightguide and a third lightguide, wherein the lightguide, the second lightguide, and the third lightguide extend radially from a central portion of the luminaire, and wherein the central portion of the luminaire comprises an occupancy sensor or a smoke detector.

16. The luminaire of claim 13, wherein the lightguide is one of a plurality of lightguides with respective light-emitting edges that are disposed outside the enclosure and that are arranged to form a grid.

17. The luminaire of claim 13, wherein the rigid substrate comprises a thick film coated on a sheet of metal, and wherein the cover comprises a concave region defined by a smooth curve, the concave region configured for facing an area to be illuminated.

18. A luminaire comprising:

an array of light emitting diodes positioned adjacent a rigid substrate to emit light;

a cover that extends over the rigid substrate and that comprises an aperture and a concave region defined by a smooth curve configured for reflecting the light emitted by the array of light emitting diodes; and a lightguide that extends through the aperture and that comprises:

a first edge that extends lengthwise along the array of light emitting diodes to receive light from the array of light emitting diodes;

a second edge opposite the first edge; and first and second major surfaces that extend between the first edge and the second edge and that are operative to guide light between the first edge and the second edge via total internal reflection, the first and second major surfaces disposed in the concave region.

* * * * *